US012162157B2

(12) United States Patent
Ouellette

(10) Patent No.: US 12,162,157 B2
(45) Date of Patent: Dec. 10, 2024

(54) SYSTEMS AND METHODS FOR RANDOMIZED AUTONOMOUS ROBOT SECURITY APPLICATIONS

(71) Applicant: TYCO FIRE & SECURITY GMBH, Schaffhausen (CH)

(72) Inventor: Jason M. Ouellette, Sterling, MA (US)

(73) Assignee: TYCO FIRE & SECURITY GMBH, Neuhausen Am Rheinfall (CH)

( * ) Notice: Subject to any disclaimer, the term of this patent is extended or adjusted under 35 U.S.C. 154(b) by 22 days.

(21) Appl. No.: 17/489,225

(22) Filed: Sep. 29, 2021

(65) Prior Publication Data

US 2023/0106617 A1 Apr. 6, 2023

(51) Int. Cl.
*B25J 9/16* (2006.01)
*B25J 11/00* (2006.01)
*G05D 1/00* (2024.01)

(52) U.S. Cl.
CPC ........... *B25J 9/1661* (2013.01); *B25J 11/002* (2013.01); *G05D 1/0212* (2013.01); *G05D 1/0274* (2013.01)

(58) Field of Classification Search
None
See application file for complete search history.

(56) References Cited

U.S. PATENT DOCUMENTS

| | | | |
|---|---|---|---|
| 9,717,387 B1 * | 8/2017 | Szatmary | A47L 9/2805 |
| 10,471,611 B2 | 11/2019 | Dooley et al. | |
| 2005/0216182 A1 | 9/2005 | Hussain et al. | |
| 2012/0313779 A1 * | 12/2012 | Papaefstathiou | G08B 13/19684 701/25 |
| 2016/0379056 A1 * | 12/2016 | Taite | G06V 40/16 348/144 |
| 2017/0225336 A1 * | 8/2017 | Deyle | B25J 5/007 |
| 2018/0281945 A1 * | 10/2018 | Needham | B64C 39/024 |
| 2020/0108303 A1 * | 4/2020 | Marten | A63B 57/00 |

OTHER PUBLICATIONS

International Search Report and Written Opinion in PCT/US2022/077196, mailed on Jan. 23, 2023, 14 pages.
Korpela et al., "A framework for autonomous and continuous aerial intelligence, surveillance, and reconnaissance operations," Proceedings of SPIE, May 2016, vol. 9828, pp. 982803-1-982803-10.

* cited by examiner

*Primary Examiner* — Jaime Figueroa
*Assistant Examiner* — Arslan Azhar
(74) *Attorney, Agent, or Firm* — ArentFox Schiff LLP

(57) ABSTRACT

Systems and methods for randomized autonomous robot security applications may include a security system that generate a patrol area of a facility and select a random waypoint from a plurality of waypoints in the patrol area for an autonomous mobile machine to surveillance. The security system may also select a surveillance task to be performed by the autonomous mobile machine at the random waypoint, and transmit, to the autonomous mobile machine, instructions to visit the random waypoint and perform the surveillance task. When the security system receives, from the autonomous mobile machine, an indication that the autonomous mobile machine has completed the surveillance task at the random waypoint, the security system may transmit a subsequent random waypoint of the plurality of waypoints of the patrol area along with a subsequent surveillance task to be performed at the subsequent random waypoint.

23 Claims, 5 Drawing Sheets

SYSTEMS AND METHODS FOR RANDOMIZED AUTONOMOUS ROBOT SECURITY APPLICATIONS

TECHNICAL FIELD

The present disclosure relates generally to security systems, and more particularly, to systems and methods for randomized autonomous robot security applications.

BACKGROUND

Facilities may use surveillance robots, such as wheeled robots, legged robots, or drones, for a number of functions including security and surveillance of the facilities. Conventionally, a surveillance robot has a surveillance route stored in a memory of the surveillance robot which provides instructions for the surveillance robot to move around a facility. In some situations, a surveillance route may be easily discoverable by an individual watching the surveillance robot or from the memory of the surveillance robot being compromised thereby allowing the individual access to the instructions corresponding to the surveillance route.

In view of the foregoing, there is a need for improvements in security systems that use surveillance robots.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, a security system including a memory storing instructions and one or more processors coupled with the memory, is provided. The security system may be configured to select a random waypoint from a plurality of waypoints of a patrol area in a facility for an autonomous mobile machine to surveil. The security system may be configured to transmit, to the autonomous mobile machine in response to the random waypoint being selected, a message indicating the random waypoint. The security system may be configured to receive, from the autonomous mobile machine in response to the message being transmitted, an indication that the autonomous mobile machine has completed a surveillance task at the random waypoint and awaits a subsequent random waypoint of the plurality of waypoints, wherein the subsequent random waypoint is different from the random waypoint.

In another aspect, a method for a security system to randomize a patrol area in a facility for an autonomous mobile machine, is provided. The method may include selecting a random waypoint from a plurality of waypoints of the patrol area in the facility for the autonomous mobile machine to surveil. The method may include transmitting, to the autonomous mobile machine in response to the random waypoint being selected, a message indicating the random waypoint. The method may include receiving, from the autonomous mobile machine in response to the message being transmitted, an indication that the autonomous mobile machine has completed a surveillance task at the random waypoint and awaits a subsequent random waypoint of the plurality of waypoints, wherein the subsequent random waypoint is different from the random waypoint.

In another aspect, a computer-readable medium storing computer executable code for a security system to randomize a patrol area in a facility for an autonomous mobile machine, is provided. The computer-readable medium may include code to select a random waypoint from a plurality of waypoints of a patrol area in a facility for an autonomous mobile machine to surveil. The computer-readable medium may include code to transmit, to the autonomous mobile machine in response to the random waypoint being selected, a message indicating the random waypoint. The computer-readable medium may include code to receive, from the autonomous mobile machine in response to the message being transmitted, an indication that the autonomous mobile machine has completed a surveillance task at the random waypoint and awaits a subsequent random waypoint of the plurality of waypoints, wherein the subsequent random waypoint is different from the random waypoint.

Further aspects of the present disclosure are described in more details below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Security systems are often used at public and private facilities, such as commercial buildings, businesses, retail establishments, schools, hospitals and government buildings, to list a few examples. Some security systems include surveillance robots that patrol routes within the facilities for surveillance purposes. Conventionally, the routes provide a loop for the surveillance robots to repeatedly patrol the same areas of the facilities. In some situations, a route may be easily discoverable by an individual watching a surveillance robot or by a memory system of the surveillance robot being compromised to allow the individual to obtain the stored route.

Aspects of the present disclosure include systems and methods for randomized autonomous robot security applications. In an example, a security system may provide a randomized waypoint to a surveillance robot along with instructions for performing one or more surveillance tasks at and/or along the way to the waypoint. Once the surveillance robot has reached the first waypoint and accomplished the surveillance tasks, the security system may provide a randomized subsequent waypoint along with a second set of instructions for performing tasks at and/or along the way to the subsequent waypoint. Based on the systems and methods disclosed herein, an individual may not be able to discover a surveillance route of the surveillance robot, as each waypoint is randomized by the security system, and the memory of the surveillance robot does not store a route for the surveillance robot to follow:

Turning now to the figures, example aspects are depicted with reference to one or more components described herein, where components in dashed lines may be optional.

Figure 1:
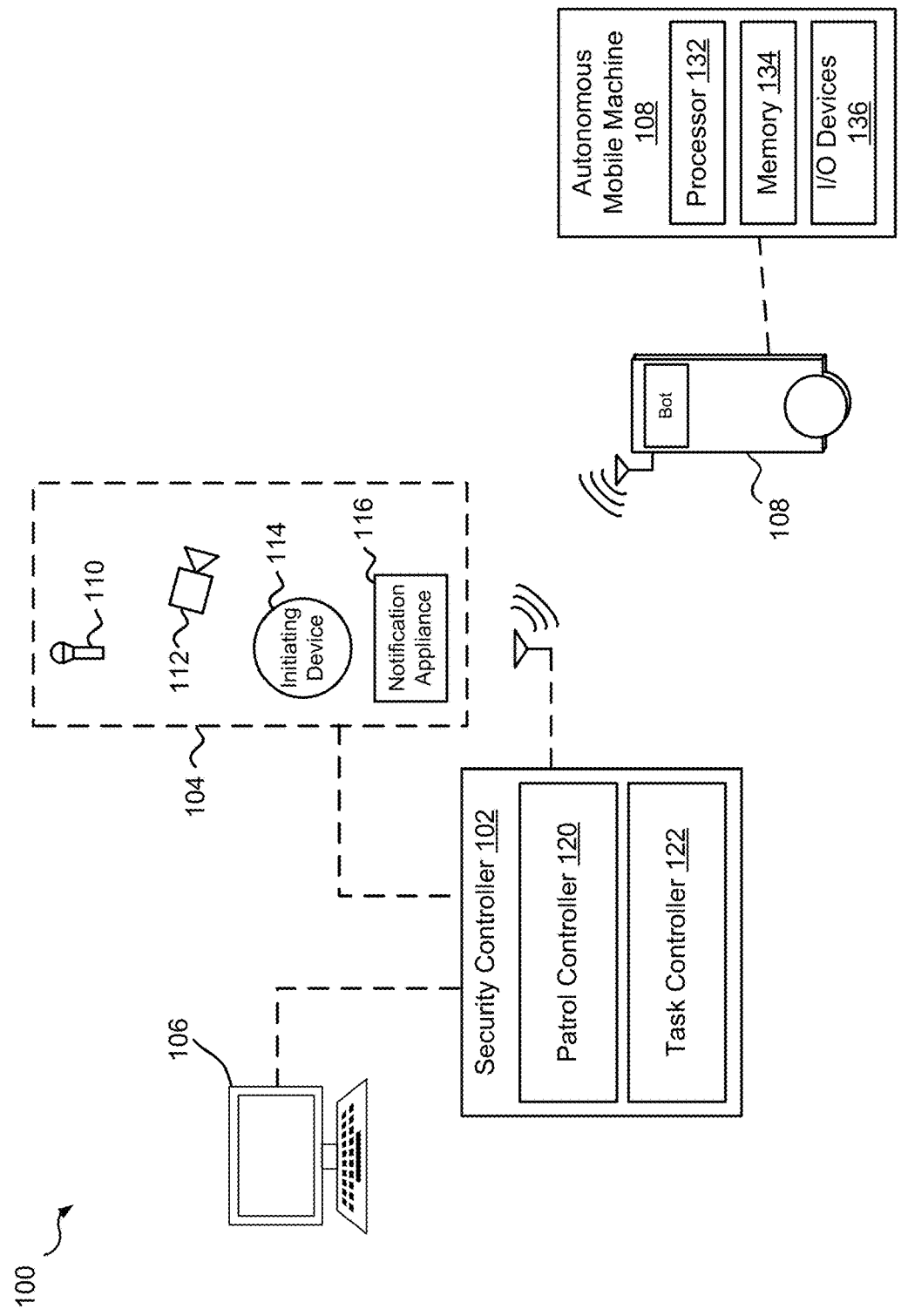
FIG. 1 is a conceptual diagram of an example security system, according to aspects of the present disclosure.

Referring to FIG. 1, an example security system 100 deployed at an facility is depicted. The security system 100 may include a security controller 102 configured to manage security and surveillance functions of the facility. For example, the security control system may communicate with one or more input/output (I/O) devices 104 configured to provide one or more sensor readings or measurements from the facility to the security controller 102 and receive signals for outputting one or more notifications in the facility. Examples of the I/O devices 104 may include, but are not limited to, one or more audio sensors 110 (e.g., microphone), imaging devices 112 (e.g., camera), initiating devices 114 (e.g., fire sensor, smoke sensor, gas sensor, temperature sensor, humidity sensor, or a pull switch), or notification appliances 116 (e.g., alarm or strobe lights).

The security controller 102 may also communicate with one or more monitoring stations 106. In an example, the security controller 102 may transmit information corresponding to input devices of the I/O devices 104 (e.g., audio/video sample from audio sensor 110/imaging device 112 or signal from initiating devices 114) to a monitoring station 106 and may receive instructions from the monitoring station 106 to enable one or more notification appliances 116.

In an aspect, communication between the security controller 102 and the I/O devices 104 or the security controller 102 and the monitoring station 106 may be through a wired (e.g., fiber optics or cable) link and/or wireless link (e.g., Wi-Fi or cellular).

The security controller 102 may also communicate with one or more autonomous (e.g., fully autonomous or semi-autonomous) mobile machines 108 capable of moving about the facility to provide security and surveillance functions at different areas and/or waypoints of the facility. In an example, the security controller 102 may include a patrol controller 120 configured to generate one or more patrol areas of the facility. The patrol areas may include sets of waypoints corresponding to different areas of a map for an autonomous mobile machine 108 to conduct one or more surveillance tasks. In an example, the security controller 102 may also include a task controller 122 configured to determine one or more surveillance tasks for the autonomous mobile machine 108 to conduct at a waypoint. In an example, the task controller 122 may determine surveillance tasks based on a list of tasks associated with a waypoint. In another example, the task controller 122 may determine surveillance tasks by selecting one or more tasks based on a capability of autonomous mobile machines 108.

In an aspect, the autonomous mobile machine 108 may include one or more processors 132 for controlling the autonomous mobile machine 108 based on instructions received from the security controller 102 or stored in a memory 134. In an example, the memory 134 may store data corresponding to a map of the facility and designated waypoints throughout the facility. The data corresponding to the map and the designated waypoints may be received from and/or updated by the security controller 102. In an example, the autonomous mobile machine 108 also includes one or more I/O devices 136 including, but not limited to, an audio sensor (e.g., microphone), an imaging device (e.g., image/video camera), a sensor, such as, a fire sensor, a smoke sensor, a gas (e.g., $CO_2$, methane, butane, propane) sensor, temperature sensor, humidity sensor, air quality sensor, alarming device (e.g., speaker), display, or lights.

Figure 2:
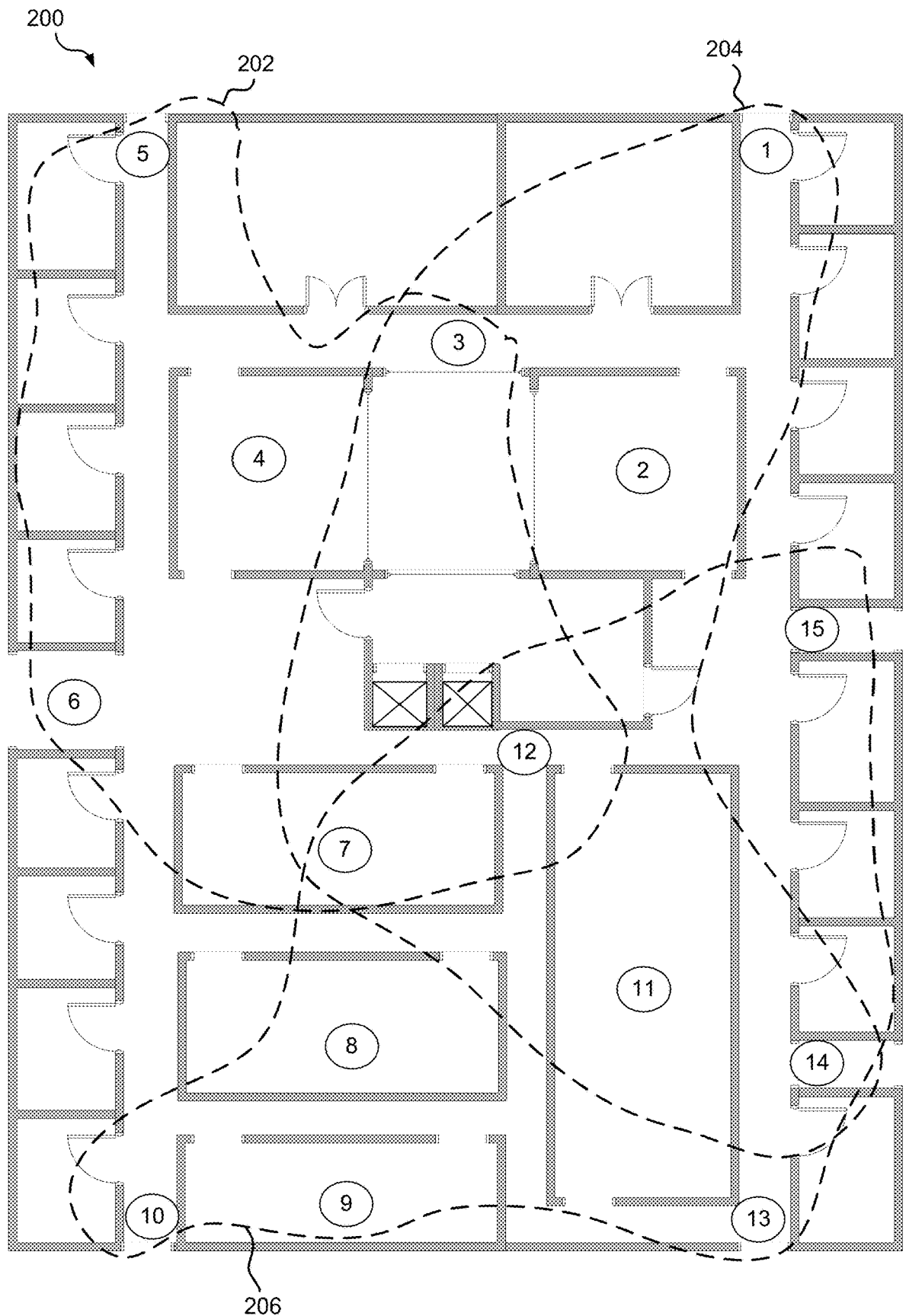
FIG. 2 is a block diagram of an example map and waypoints used by the security system of FIG. 1, according to aspects of the present disclosure.

Referring to FIG. 2, an example map 200 of a facility may include a plurality of waypoints (e.g., waypoints 1-15) for surveillance purposes. Conventionally, a surveillance robot stores data for a patrol route (e.g. path sequentially following waypoints 1-15) for the surveillance robot to follow and provide surveillance of the facility. Once the surveillance robot has reached a final waypoint (e.g., waypoint 15) of the patrol route, the surveillance robot returns to the first waypoint (e.g., waypoint 1) to initiate the same patrol route again or returns to a charging station until, for example, a designated time to initiate the patrol route again. By following the same patrol route, an individual may easily observe the patrol route and avoid detection by a security system. Additionally, by storing the patrol route in the surveillance robot, an individual may obtain a map of the patrol route when, for example, the surveillance robot is being repaired or is stolen.

Aspects of the current disclosure provide techniques to overcome the shortcomings of conventional surveillance robots by the randomization of waypoints that a surveillance robot will travel to. As described in greater detail below, the security controller 102 may generate one or more patrol areas 202-206 of the map 200, and transmit a random waypoint (e.g., one of waypoints 1-15) from a patrol area to the autonomous mobile machine 108 along with surveillance tasks to be performed at the random waypoint. Once the tasks are completed, the security controller 102 may transmit a subsequent random waypoint of the patrol area and tasks to be performed at the subsequent random waypoint. By transmitting a single random waypoint at a time, the security controller 102 may prevent observational detection of a patrol route because the autonomous mobile machine 108 randomly covers a patrol area and does not follow a patrol route. Further, the security controller 102 may prevent an individual from gaining knowledge of a patrol area because the autonomous mobile machine 108 does not know (e.g., does not store) a patrol route or the patrol area, instead the robot knows its current position and to which waypoint it is instructed to visit.

Figure 3:
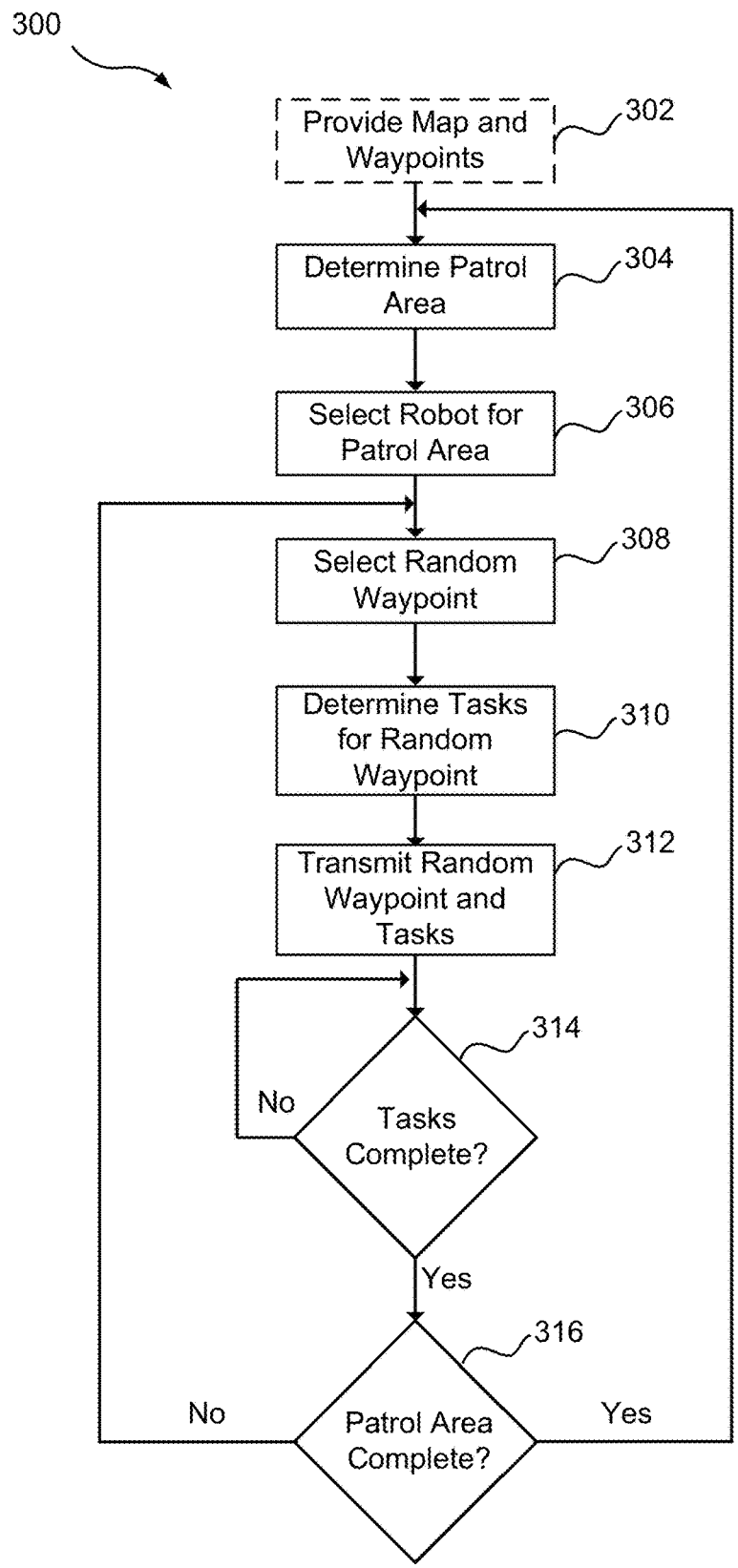
FIG. 3 is a flowchart of an example method implemented by the security system of FIG. 1, according to aspects of the present disclosure.

Referring to FIG. 3, an example method 300 of controlling the security system 100 is depicted. The operations of the method 300 may be performed by one or more components (e.g., security controller 102 of FIG. 1, and/or processor 404, memory 408, memory 410, or communications interface 424 of FIG. 4) of the security system 100, as described herein.

At block 302, data for the map 200 may optionally be provided to the autonomous mobile machine 108 along with data for the plurality of waypoints 1-15 in the map 200. The data may allow the autonomous mobile machine 108 to know a layout of a facility (e.g., floor or designated area) and determine paths between the waypoints 1-15. In an example, the map 200 and/or waypoints 1-15 may be transmitted from the security controller 102 to the autonomous mobile machine 108. In other examples, the autonomous mobile machine 108 may receive data for the map 200 and the waypoints 1-15 through a manual installation.

At block 304, the patrol controller 120 may determine one or more patrol areas 202, 204, 206 corresponding to the map 200. Each of the patrol areas 202, 204, and 206 may include a set of waypoints. For example, as illustrated by FIG. 2, the patrol area 202 may include waypoints 3-7 and 12, the patrol area 204 may include waypoints 1-3, 7, 11, 12, and 14, and the patrol area 206 may include waypoints 7-15. In an example, patrol areas may be stored in memory. The patrol controller 120 may determine a patrol area by using, for example, a look up table to obtain the patrol area.

In an example, a number of patrol areas may be based a number of autonomous mobile machines 108 operable at the facility. For example, the number of patrol areas may be equal to or greater than the number of autonomous mobile machines 108. However, in some examples, the number of patrol areas may be less than the number of autonomous mobile machines 108.

In an aspect, the patrol controller 120 may generate random patrol areas 202, 204, and 206 by selecting a random number (e.g., 7) of waypoints for a patrol area (e.g., patrol area 204) and then selecting random index values corresponding to the waypoints until the random number of waypoints is reached.

When one or more patrol areas are generated, at block 306, the patrol controller 120 may select an autonomous mobile machine 108 to assign to or patrol the generated patrol area. For example, the patrol controller 120 may select one of the autonomous mobile machines 108 randomly or based on, for example, one or more characteristics (e.g., proximity of autonomous mobile machine 108 to patrol area or functioning I/O devices 136) of the autonomous mobile machine 108. In another example, the patrol controller 120 may transmit an availability signal to a plurality of autonomous mobile machines 108 and may select an autonomous mobile machine 108 from a set of autonomous mobile machines 108 that responded to the availability signal.

At block 308, the patrol controller 120 may select a random waypoint from the set of waypoints in the patrol area. For example, for a first random waypoint, the patrol controller 120 may select a random index value associated with a waypoint (e.g., waypoint 11) from the set of waypoints of the selected patrol area (e.g., patrol area 204) that is assigned to the autonomous mobile machine 108.

At block 310, the task controller 122 may determine surveillance tasks to be performed by the autonomous mobile machine 108 at (and/or along the way) the random waypoint. The tasks may include, but are not limited to, capturing audio/image/video samples, enabling one or more of sensors (e.g., fire sensor, smoke sensor, gas sensor, temperature sensor, humidity sensor, air quality sensor), activating one or more alarming devices displays, or lights, or arriving at the random waypoint at a designated time or remaining at the random waypoint for the designated time. In an example, the task controller 122 may select one or more default tasks that correspond to the random waypoint. In another example, the task controller 122 may select the one or more tasks based on the capability of the autonomous mobile machine 108 (e.g., what I/O devices 136 are installed on autonomous mobile machine 108), a recent alert (e.g., minor detection of gas or false alarm) from an initiating device 114 of the security system 100, or an indication (e.g., manual request from user) from the monitoring station 106 of the security system 100.

At block 312, the security controller 102 may transmit the random waypoint and tasks to the autonomous mobile machine 108, and wait to receive, from the autonomous mobile machine 108, an indication that all of the tasks are complete at the random waypoint, at block 314. In an example, the security controller 102 may receive from the autonomous mobile machine 108 one or more indications regarding tasks. An indication may include, for example, a simple message indicating that a task is complete, data (e.g., video/audio sample, measurements from sensors, analysis of captured data) from a task, a location of the autonomous mobile machine 108, or any additional information that may indicate to the security controller 102 that a task has been complete.

When the security controller 102 determines all tasks are complete, the security controller 102 determines whether the patrol area (e.g., patrol area 204) is complete, at block 316. For example, the security controller 102 determines whether all waypoints in the patrol area have been visited by the autonomous mobile machine 108. If the autonomous mobile machine 108 needs to visit remaining waypoints in the patrol area, the security controller 102 selects a subsequent random waypoint, at block 308, from the remaining waypoints in the patrol area, and subsequently performs the operations of blocks 310-316 until all waypoints in the patrol area have been visited and all tasks been performed. When the patrol area is complete, at block 316, the security controller 102 may generate a new patrol area, at block 304, thereby allowing the autonomous mobile machine 108 to return to a charging station or wait for instructions for a random waypoint in a new patrol area.

Figure 4:
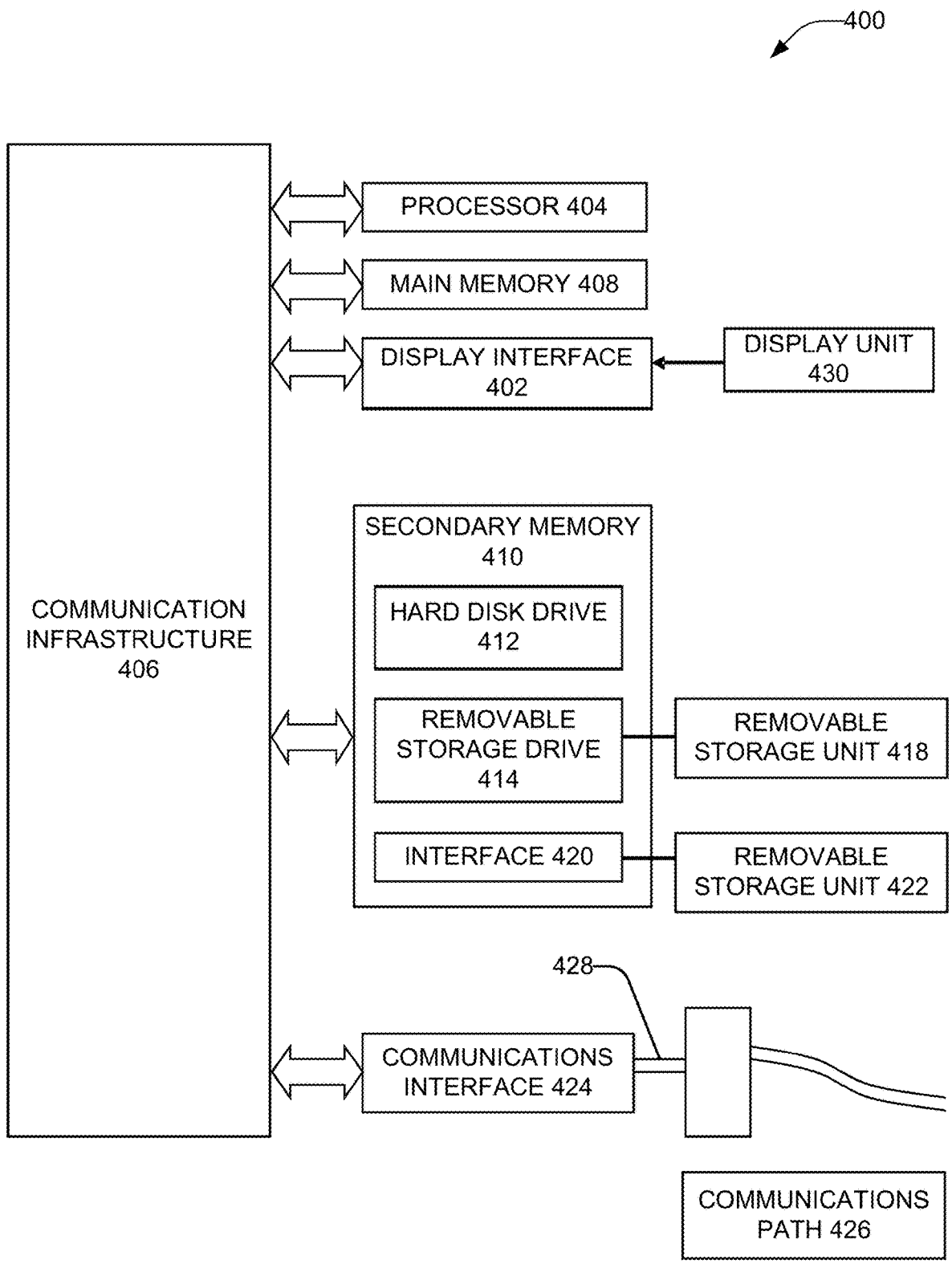
FIG. 4 is a block diagram of the example security control system of FIG. 1 including various hardware components and other features, according to aspects of the present disclosure.

Referring to FIG. 4, an example system 400 is presented with a diagram of various hardware components and other features, for use in accordance with an aspect of the present disclosure. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system 400 is shown in FIG. 4. In an aspect, the security controller 102 of FIG. 1 may be implemented using the computer system 400.

The computer system 400 may include one or more processors, such as processor 404. The processor 404 may be connected to a communication infrastructure 406 (e.g., a communications bus, cross-over bar, or network). Various software aspects are described in terms of this example computer system 400. After reading this description, it will become apparent to an individual skilled in the relevant art(s) how to implement aspects described herein using other computer systems and/or architectures.

The computer system 400 may include a display interface 402 that forwards graphics, text, and other data from the communication infrastructure 406 (or from a frame buffer not shown) for display on a display unit 430. The computer system 400 may also include a main memory 408, e.g., random access memory (RAM), and may also include a secondary memory 410. The secondary memory 410 may include, e.g., a hard disk drive 412 and/or a removable storage drive 414, representing a floppy disk drive, a magnetic tape drive, an optical disk drive, etc. The removable storage drive 414 may read from and/or write to a removable storage unit 418 in a well-known manner. The removable storage unit 418, represents a floppy disk, magnetic tape, optical disk, etc., which is read by and written to the removable storage drive 414. As will be appreciated, the removable storage unit 418 may include a computer usable storage medium having stored therein computer software and/or data.

In alternative aspects, the secondary memory 410 may include other similar devices for allowing computer programs or other instructions to be loaded into the computer system 400. Such devices may include, e.g., a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to the computer system 400.

The computer system 400 may also include a communications interface 424. The communications interface 424 may allow software and data to be transferred between the computer system 400 and external devices. Examples of the communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical, wireless, or other signals capable of being received by the communications interface 424. These signals 428 are provided to the communications interface 424 via a communications path (e.g., channel) 426. The communications path 426 may carry signals 428 and may be implemented using wire or cable, fiber optics, a telephone line, a cellular link, a radio frequency (RF) link and/or other communications channels. The terms "computer program medium," "computer usable medium," "computer readable medium," or "non-transitory computer readable medium" may be used to refer generally to media such as a removable storage drive, a hard disk installed in a hard disk drive, and/or signals 428. These computer program products provide software to the computer system 400. Aspects described herein may be directed to such computer program products.

Computer programs (also referred to as computer control logic or applications may be stored in the main memory 408 and/or the secondary memory 410. The computer programs may also be received via the communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400. The computer programs may include instructions or code for executing methods described herein.

In variations where aspects described herein are implemented using software, the software may be stored in a computer program product and loaded into the computer system 400 using the removable storage drive 414, the hard disk drive 412, or the interface 420. The control logic (software), when executed by the processor 404, causes the processor 404 to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to individuals skilled in the relevant art(s).

In yet another example variation, aspects described herein are implemented using a combination of both hardware and software.

Figure 5:
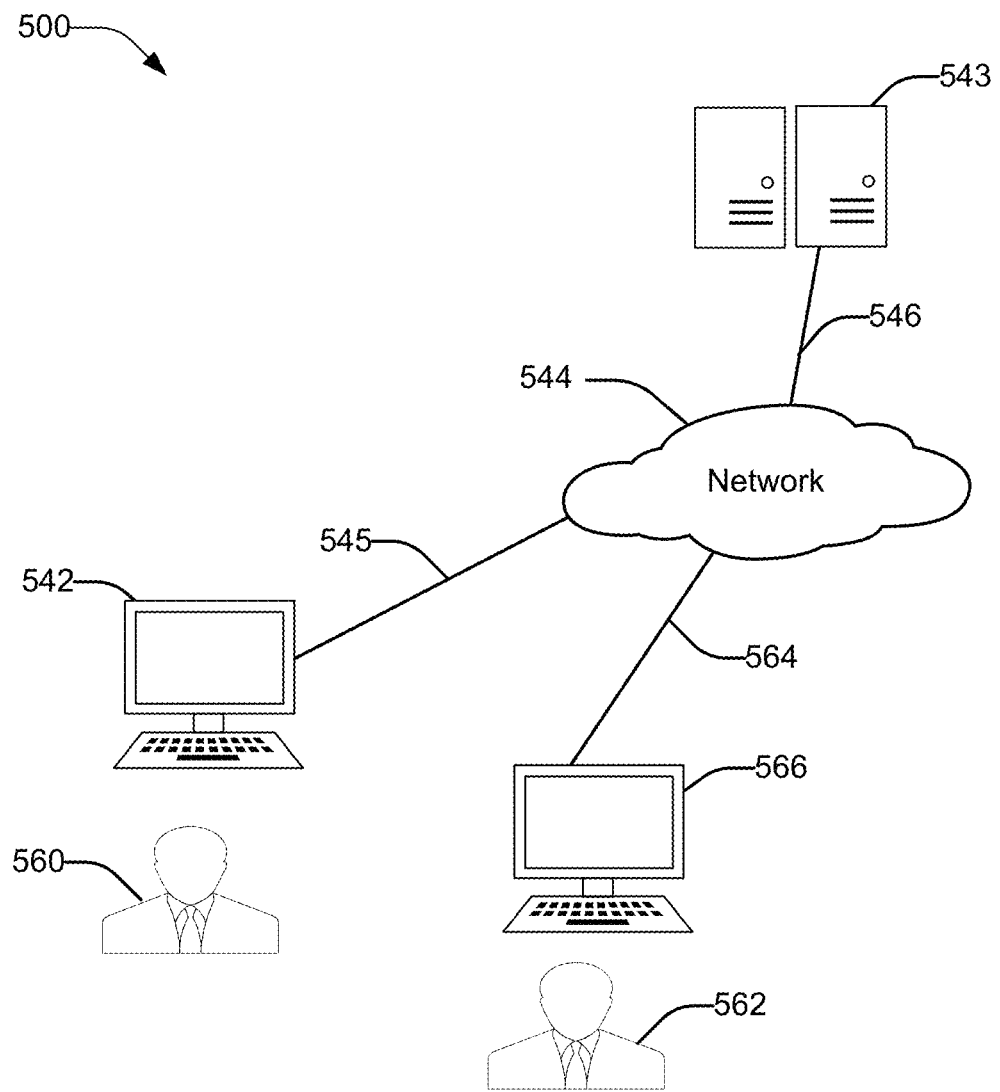
FIG. 5 is a block diagram of various example system components of the security system of FIG. 1, according to aspects of the present disclosure.

FIG. 5 is a block diagram of various example system components. FIG. 5 shows a communication system 500 including one or more users 560, 562 and one or more terminals 542, 566. The terminals 542, 566 may include the security controller 102 or the monitoring station 106 of FIG. 1 or the computer system 400 of FIG. 4 or a related system or subsystem, and/or the like. In one aspect, data for use in accordance with aspects described herein may be input and/or accessed by the users 560, 562 via the terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, a network 544 for instance, such as the Internet or an intranet, and couplings 545, 546, 564. The couplings 545, 546, 564 may include wired, wireless, or fiber optic links. In another example variation, the method and system in accordance with aspects described herein operate in a stand-alone environment, such as on a single terminal.

Additional Embodiments

An example security system, comprising: a memory storing instructions; and one or more processors coupled with the memory and configured to: select a random waypoint from a plurality of waypoints of a patrol area in a facility for an autonomous mobile machine to surveil: transmit, to the autonomous mobile machine in response to the random waypoint being selected, a message indicating the random waypoint; and receive, from the autonomous mobile machine in response to the message being transmitted, an indication that the autonomous mobile machine has completed a surveillance task at the random waypoint and awaits a subsequent random waypoint of the plurality of waypoints, wherein the subsequent random waypoint is different from the random waypoint.

The above-example security system, wherein the one or more processors is further configured to: generate the patrol area of the facility for the autonomous mobile machine based on a set of waypoints of the plurality of waypoints, wherein the random waypoint is selected from the set of waypoints corresponding to the patrol area.

One or more of the above-example security systems, wherein each waypoint of the plurality of waypoints corresponds to a respective index value of a plurality of index values, and wherein the one or more processors selects the random waypoint based on a random selection of the respective index value.

One or more of the above-example security systems, wherein the one or more processors is further configured to: determine the surveillance task to be performed by the autonomous mobile machine at the random waypoint, in response to the random waypoint being selected; and transmit data indicating the surveillance task to the autonomous mobile machine.

One or more of the above-example security systems, wherein the one or more processors is further configured to:

determine the surveillance task based on one or more of a default surveillance task corresponding to the random waypoint, an alert from an initiating device of the security system, or an indication from a monitoring station.

One or more of the above-example security systems, wherein the surveillance task comprises one or more of capturing audio, image, or video samples at the random waypoint or initiating a sensor of the autonomous mobile machine.

One or more of the above-example security systems, wherein the one or more processors is further configured to: transmit, to the autonomous mobile machine, an indication of a map of the facility and the plurality of waypoints, wherein the random waypoint is selected subsequent to the indication being transmitted.

One or more of the above-example security systems, wherein the one or more processors is further configured to: transmit, to the autonomous mobile machine, a timing indication indicating a time for the autonomous mobile machine to arrive or remain at the random waypoint.

An example method for a security system to randomize a patrol area in a facility for an autonomous mobile machine, comprising: selecting a random waypoint from a plurality of waypoints of the patrol area in the facility for the autonomous mobile machine to surveil; transmitting, to the autonomous mobile machine in response to the random waypoint being selected, a message indicating the random waypoint; and receiving, from the autonomous mobile machine in response to the message being transmitted, an indication that the autonomous mobile machine has completed a surveillance task at the random waypoint and awaits a subsequent random waypoint of the plurality of waypoints, wherein the subsequent random waypoint is different from the random waypoint.

The above-example method, further comprising: generating the patrol area of the facility for the autonomous mobile machine based on a set of waypoints of the plurality of waypoints, wherein the random waypoint is selected from the set of waypoints corresponding to the patrol area.

One or more of the above-example methods, wherein each waypoint of the plurality of waypoints corresponds to a respective index value of a plurality of index values, and wherein the one or more processors selects the random waypoint based on a random selection of the respective index value.

One or more of the above-example methods, wherein the one or more processors is further configured to: determine the surveillance task to be performed by the autonomous mobile machine at the random waypoint, in response to the random waypoint being selected; and transmit data indicating the surveillance task to the autonomous mobile machine.

One or more of the above-example methods, wherein the one or more processors is further configured to: determine the surveillance task based on one or more of a default surveillance task corresponding to the random waypoint, an alert from an initiating device of the security system, or an indication from a monitoring station.

One or more of the above-example methods, wherein the surveillance task comprises one or more of capturing audio, image, or video samples at the random waypoint or initiating a sensor of the autonomous mobile machine.

One or more of the above-example methods, further comprising: transmit, to the autonomous mobile machine, an indication of a map of the facility and the plurality of waypoints, wherein the random waypoint is selected subsequent to the indication being transmitted.

One or more of the above-example methods, further comprising: transmit, to the autonomous mobile machine, a timing indication indicating a time for the autonomous mobile machine to arrive or remain at the random waypoint.

An example computer-readable medium storing computer executable code for a security system to randomize a patrol area in a facility for an autonomous mobile machine, the computer-readable medium comprising code to: select a random waypoint from a plurality of waypoints of a patrol area in a facility for an autonomous mobile machine to surveil; transmit, to the autonomous mobile machine in response to the random waypoint being selected, a message indicating the random waypoint; and receive, from the autonomous mobile machine in response to the message being transmitted, an indication that the autonomous mobile machine has completed a surveillance task at the random waypoint and awaits a subsequent random waypoint of the plurality of waypoints, wherein the subsequent random waypoint is different from the random waypoint.

The above-example computer-readable medium of claim 17, further comprising code to: generate the patrol area of the facility for the autonomous mobile machine based on a set of waypoints of the plurality of waypoints, wherein the random waypoint is selected from the set of waypoints corresponding to the patrol area.

One or more of the above-example computer-readable mediums, wherein each waypoint of the plurality of waypoints corresponds to a respective index value of a plurality of index values, and wherein the one or more processors selects the random waypoint based on a random selection of the respective index value.

One or more of the above-example computer-readable mediums, further comprising code to: determine the surveillance task to be performed by the autonomous mobile machine at the random waypoint, in response to the random waypoint being selected; and transmit data indicating the surveillance task to the autonomous mobile machine.

One or more of the above-example computer-readable mediums, further comprising code to: determine the surveillance task based on one or more of a default surveillance task corresponding to the random waypoint, an alert from an initiating device of the security system, or an indication from a monitoring station.

One or more of the above-example computer-readable mediums, wherein the surveillance task comprises one or more of capturing audio, image, or video samples at the random waypoint or initiating a sensor of the autonomous mobile machine.

One or more of the above-example computer-readable mediums, further comprising code to: transmit, to the autonomous mobile machine, an indication of a map of the facility and the plurality of waypoints, wherein the random waypoint is selected subsequent to the indication being transmitted.

One or more of the above-example computer-readable mediums, further comprising code to: transmit, to the autonomous mobile machine, a timing indication indicating a time for the autonomous mobile machine to arrive or remain at the random waypoint.

The previous description is provided to enable any individual skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A security system, comprising:
a memory storing instructions; and
one or more processors coupled with the memory and configured to:
select a random waypoint from a plurality of waypoints in a facility for an autonomous mobile machine to surveil;
determine, based on the random waypoint, a first surveillance task to be performed by the autonomous mobile machine at the random waypoint;
transmit, via a network, to the autonomous mobile machine in response to the random waypoint being selected, a first message indicating the random waypoint and the first surveillance task, wherein the first message is configured to control the autonomous mobile machine to move to the random waypoint and perform the first surveillance task;
receive, via the network, from the autonomous mobile machine in response to the first message being transmitted, an indication that the autonomous mobile machine has completed the first surveillance task at the random waypoint;
select a subsequent random waypoint of the plurality of waypoints for the autonomous mobile machine to surveil in response to receiving the indication that the autonomous mobile machine has completed the surveillance task at the random waypoint, wherein the subsequent random waypoint is different from the random waypoint; and
transmit, via the network, to the autonomous mobile machine in response to the subsequent random waypoint being selected in response to receiving the indication that the autonomous mobile machine has completed the surveillance task at the random waypoint, a second message indicating the subsequent random waypoint, wherein the second message is configured to control the autonomous mobile machine to move to the subsequent random waypoint,
wherein each waypoint of the plurality of waypoints corresponds to a respective index value of a plurality of index values and the plurality of waypoints corresponds to a randomly selected number.

2. The security system of claim 1, wherein the one or more processors is further configured to:
generate a patrol area of the facility for the autonomous mobile machine based on a set of waypoints of the plurality of waypoints, wherein the random waypoint and the subsequent random waypoint are selected from the set of waypoints corresponding to the patrol area.

3. The security system of claim 1,
wherein the one or more processors is configured to respectively select the random waypoint and the subsequent random waypoint based on a random selection of the respective index value corresponding to the random waypoint and the subsequent random waypoint.

4. The security system of claim 1, wherein to determine the first surveillance task, the one or more processors is further configured to:
determine the first surveillance task based on one or more of a default surveillance task corresponding to the random waypoint, an alert from an initiating device of the security system, or an indication from a monitoring station.

5. The security system of claim 1, wherein the first surveillance task comprises one or more of capturing audio, image, or video samples at the random waypoint, or initiating a sensor of the autonomous mobile machine.

6. The security system of claim 1, wherein the one or more processors is further configured to:
transmit, to the autonomous mobile machine, an indication of a map of the facility and the plurality of waypoints, wherein the random waypoint and the subsequent random waypoint are selected subsequent to the indication being transmitted.

7. The security system of claim 1, wherein the one or more processors is further configured to:
transmit, to the autonomous mobile machine, a respective timing indication indicating a time for the autonomous mobile machine to arrive or remain at the random waypoint and/or the subsequent random waypoint.

8. The security system of claim 1, wherein the one or more processors is further configured to:
transmit, to the autonomous mobile machine, a respective timing indication indicating a time for the autonomous mobile machine to remain at the random waypoint and/or the subsequent random waypoint.

9. The security system of claim 1, wherein the one or more processors is further configured to:
determine, based on the subsequent random waypoint, a second surveillance task to be performed by the autonomous mobile machine at the subsequent random waypoint.

10. A method for a security system to randomize a patrol area in a facility for an autonomous mobile machine, comprising:
selecting a random waypoint from a plurality of waypoints of the patrol area in the facility for the autonomous mobile machine to surveil;

determining, based on the random waypoint, a first surveillance task to be performed by the autonomous mobile machine at the random waypoint;

transmitting, via a network, to the autonomous mobile machine in response to the random waypoint being selected, a first message indicating the random waypoint and the first surveillance task, wherein the first message is configured to control the autonomous mobile machine to move to the random waypoint and perform the first surveillance task;

receiving, via the network, from the autonomous mobile machine in response to the first message being transmitted, an indication that the autonomous mobile machine has completed the first surveillance task at the random waypoint;

selecting a subsequent random waypoint of the plurality of waypoints for the autonomous mobile machine to surveil in response to receiving the indication that the autonomous mobile machine has completed the surveillance task at the random waypoint, wherein the subsequent random waypoint is different from the random waypoint; and transmitting, via the network, to the autonomous mobile machine in response to the subsequent random waypoint being selected in response to receiving the indication that the autonomous mobile machine has completed the surveillance task at the random waypoint, a second message indicating the subsequent random waypoint, wherein the second message is configured to control the autonomous mobile machine to move to the subsequent random waypoint, wherein each waypoint of the plurality of waypoints corresponds to a respective index value of a plurality of index values and the plurality of waypoints corresponds to a randomly selected number.

11. The method of claim 10, further comprising:
generating a patrol area of the facility for the autonomous mobile machine based on a set of waypoints of the plurality of waypoints, wherein the random waypoint and the subsequent random waypoint are selected from the set of waypoints corresponding to the patrol area.

12. The method of claim 10, wherein the method further comprises:
respectively selecting the random waypoint and the subsequent waypoint based on a random selection of the respective index value corresponding to the random waypoint and the subsequent random waypoint.

13. The method of claim 10, wherein determining the first surveillance task comprises:
determining the first surveillance task based on one or more of a default surveillance task corresponding to the random waypoint, an alert from an initiating device of the security system, or an indication from a monitoring station.

14. The method of claim 10, wherein the first surveillance task comprises one or more of capturing audio, image, or video samples at the random waypoint, or initiating a sensor of the autonomous mobile machine.

15. The method of claim 10, further comprising:
transmitting, via the network to the autonomous mobile machine, an indication of a map of the facility and the plurality of waypoints, wherein the random waypoint and the subsequent random waypoint are selected subsequent to the indication being transmitted.

16. The method of claim 10, further comprising:
transmitting, via the network to the autonomous mobile machine, a respective timing indication indicating a time for the autonomous mobile machine to arrive or remain at the random waypoint and/or the subsequent random waypoint.

17. The method of claim 10, further comprising:
transmitting, to the autonomous mobile machine, a respective timing indication indicating a time for the autonomous mobile machine to remain at the random waypoint and/or the subsequent random waypoint.

18. The method of claim 10, further comprising:
determining, based on the subsequent random waypoint, a second surveillance task to be performed by the autonomous mobile machine at the subsequent random waypoint.

19. A non-transitory computer-readable medium storing computer executable code for a security system to randomize a patrol area in a facility for an autonomous mobile machine, the computer-readable medium comprising code to:

select a random waypoint from a plurality of waypoints in a facility for an autonomous mobile machine to surveil;

determine, based on the random waypoint, a first surveillance task to be performed by the autonomous mobile machine at the random waypoint;

transmit, via a network, to the autonomous mobile machine in response to the random waypoint being selected, a first message indicating the random waypoint and the first surveillance task, wherein the first message is configured to control the autonomous mobile machine to move to the random waypoint and perform the first surveillance task; and receive, via the network, from the autonomous mobile machine in response to the first message being transmitted, an indication that the autonomous mobile machine has completed the first surveillance task at the random waypoint;

select a subsequent random waypoint of the plurality of waypoints for the autonomous mobile machine to surveil in response to receiving the indication that the autonomous mobile machine has completed the surveillance task at the random waypoint, wherein the subsequent random waypoint is different from the random waypoint; and transmit, via the network, to the autonomous mobile machine in response to the subsequent random waypoint being selected in response to receiving the indication that the autonomous mobile machine has completed the surveillance task at the random waypoint, a second message indicating the subsequent random waypoint, wherein the second message is configured to control the autonomous mobile machine to move to the subsequent random waypoint, wherein each waypoint of the plurality of waypoints corresponds to a respective index value of a plurality of index values and the plurality of waypoints corresponds to a randomly selected number.

20. The non-transitory computer-readable medium of claim 19, further comprising code to:
generate a patrol area of the facility for the autonomous mobile machine based on a set of waypoints of the plurality of waypoints, wherein the random waypoint and the subsequent random waypoint are selected from the set of waypoints corresponding to the patrol area.

21. The non-transitory computer-readable medium of claim 19, further comprising code to:
respectively select the random waypoint and the subsequent random waypoint based on a random selection of the respective index value corresponding to the random waypoint and the subsequent random waypoint.

22. The non-transitory computer-readable medium of claim 19, further comprising code to:
transmit, to the autonomous mobile machine, a respective timing indication indicating a time for the autonomous mobile machine to remain at the random waypoint and/or the subsequent random waypoint.

23. The non-transitory computer-readable medium of claim 19, further comprising code to:
determine, based on the subsequent random waypoint, a second surveillance task to be performed by the autonomous mobile machine at the subsequent random waypoint.

* * * * *